United States Patent
Friel et al.

(10) Patent No.: US 6,689,824 B2
(45) Date of Patent: Feb. 10, 2004

(54) PREPAINTS AND METHOD OF PREPARING ROAD-MARKING PAINTS FROM PREPAINTS

(75) Inventors: John Michael Friel, Warminster, PA (US); John William Hook, III, Warminster, PA (US); Bernhard Helmut Lieser, San Pedro, CA (US); Jerry William Washel, Harleysville, PA (US); Dennis Paul Lorah, Lansdale, PA (US); Donald Craig Schall, Lansdale, PA (US); Ann Robertson Hermes, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 386 days.

(21) Appl. No.: 09/785,637

(22) Filed: Feb. 16, 2001

(65) Prior Publication Data

US 2001/0050030 A1 Dec. 13, 2001

Related U.S. Application Data

(60) Provisional application No. 60/247,639, filed on Nov. 10, 2000, provisional application No. 60/183,656, filed on Feb. 18, 2000, and provisional application No. 60/183,655, filed on Feb. 18, 2000.

(51) Int. Cl.[7] .............................. F21V 7/22; C08K 3/16; C08K 3/18
(52) U.S. Cl. ...................... 523/172; 524/413; 524/430; 524/432; 524/501
(58) Field of Search .......................... 523/172; 524/413, 524/430, 432, 501

(56) References Cited

U.S. PATENT DOCUMENTS

| | | | |
|---|---|---|---|
| 4,243,430 A | 1/1981 | Sperry et al. | 106/308 |
| 4,403,866 A | 9/1983 | Falcoff et al. | 366/138 |
| 4,436,845 A | 3/1984 | Kitano | 523/172 |
| 5,078,302 A | 1/1992 | Hellenberg | 222/144 |
| 5,129,551 A | 7/1992 | Gott | 222/135 |
| 5,527,853 A | 6/1996 | Landy et al. | 524/521 |
| 5,672,649 A | 9/1997 | Brock et al. | 524/507 |
| 5,823,670 A | 10/1998 | Rushing et al. | 366/152.1 |
| 5,842,641 A | 12/1998 | Mazzalveri | 239/104 |
| 5,922,398 A | 7/1999 | Hermes et al. | 427/137 |
| 6,013,721 A | 1/2000 | Schall et al. | 524/555 |
| 6,221,145 B1 | 4/2001 | McClain | 106/443 |
| 6,308,499 B1 | 10/2001 | Takada et al. | 53/415 |
| 2002/0007867 A1 | 1/2002 | Takada et al. | 141/94 |

FOREIGN PATENT DOCUMENTS

| | | |
|---|---|---|
| CA | 935 255 | 10/1973 |
| DE | 39 10 472 | 10/1990 |
| DE | 197 14 577 | 10/1998 |
| EP | 0 706 543 B1 | 4/1996 |
| EP | 1 094 096 | 4/2001 |
| EP | 1094 096 A1 | 4/2001 |
| EP | 0 614 951 | 9/2001 |
| IE | 940666 | 8/1994 |
| IT | PS98A000005 | 2/1998 |
| IT | 98A000005 | 8/1999 |
| WO | WO 94/25238 | 11/1994 |
| WO | WO 95/29960 | 11/1995 |
| WO | WO 98/05417 | 2/1998 |
| WO | WO 00/37568 | 6/2000 |
| WO | WO 00/44834 | 8/2000 |

OTHER PUBLICATIONS

U.S. patent application Ser. No. 09/785,389, Friel et al., filed Feb. 16, 2001.

U.S. patent application Ser. No. 09/785,147, Friel et al., filed Feb. 16, 2001.

U.S. patent application Ser. No. 09/785,152, Friel et al., filed Feb. 16, 2001.

U.S. patent application Ser. No. 09/785,376, Nungesser et al., filed Feb. 16, 2001.

Patton, "Latex Critical Pigment Volume Concentration (LCPVC)", *Paint Flow and Pigment Dispersion*, 1979, p. 193.

Forsius, "Paint Production by Component Mixing", *Faerg Lack Scand.*, 1997, 43(2), 5–6.

Dutheillet, "Integrated Solution to Build Batch Processing Plants for Blending & Formulation Industries", *Chemical Engineering World*, 1997, 32(5), 37–44.

Orcun, et al., "Scheduling of Batch Processes: An Industrial Application In Paint Industry", *Computers Chem. Enng.*, 1997, 21, S673–S678.

"Component Mixing—A New Approach to Customized Paint Production", *High Technology Finland*, 2000, 156–157.

Helander, "Benefits of delayed product differentiation", Reprinted from *PPCJ*, 1999.

Helander, "Impact of Form Postponement on Channel Members' Performance in Paint Business: A Theoretical Approach", *LTA*, 1999, p. 225–237.

*Primary Examiner*—Kriellion A. Sanders
(74) *Attorney, Agent, or Firm*—Ronald D. Bakule

(57) ABSTRACT

Sets of prepaints useful for forming a road-marking paint line are provided. Also provided are methods which permit the person applying the road-marking paint to vary the properties of the road-marking paint at the application point to suit the ambient conditions, including temperature, humidity, traffic flow and the like.

18 Claims, No Drawings

PREPAINTS AND METHOD OF PREPARING ROAD-MARKING PAINTS FROM PREPAINTS

CROSS REFERENCE TO RELATED APPLICATIONS

This application claims priority to U.S. Provisional Applications Ser. Nos. 60/183,655 filed Feb. 18, 2000, 60/183,656 filed Feb. 18, 2000, and 60/247,639 filed Nov. 10, 2000.

BACKGROUND OF THE INVENTION

1. Field of the Invention

This invention relates to sets of prepaints, a method of preparing road-marking paint lines from the sets of prepaints and to a method of preparing a range of road-marking paints from the sets of prepaints.

2. Description of Related Art

Paint formulation involves the process of selecting and admixing appropriate paint ingredients in the correct proportions to provide a paint with specific cost, processing and handling properties, as well as the desired final dry paint film properties. The major ingredients of many paint formulations are a binder, an opacifying pigment, an optional pigment extender, and a fluid medium, e.g., water if the paint is a water-borne paint such as a latex paint or a solvent if the paint is a solvent-borne paint such as an oil-based paint. Typically, optional ingredients are included such as defoamers, coalescents, plasticizers, thickeners, non-thickening rheology modifiers, solvents, driers, anti-skinning agents, surfactants, mildewcides, biocides, and dispersants. After the paint is formulated and applied to a surface, the paint dries by evaporation of the water and/or solvent, with or without the application of heat or radiation, and the binder forms a film containing therein the pigment and the extender particles, if any.

Formulating paints is complex. It is not simply a matter of mixing a few paint ingredients in different ratios. Rather, it involves the selection and mixing of different paint ingredients in different ratios depending on the type of paint desired. This requires paint manufacturers to store many different paint ingredients and change paint ingredients during manufacture depending on the specific paint type being prepared.

Furthermore, it requires those involved in the supply chain and, in particular, paint retailers to carry a large inventory of paints in order to offer a range of paints having various sheen levels, tint bases, particular end uses (i.e., exterior or interior), and various qualities. It would be desirable to make paints, either at a relatively large-scale industrial plants or on a relatively smaller-scale, at point-of-sale or at point-of-use locations using a limited number of paint ingredients to prepare all of these different paint formulations, thus minimizing the number and type of paint ingredients required to make a range of paints.

In general, road-marking paint formulations are less complex than architectural paint formulations and typically are only tinted to a limited range of colors (white, yellow, light blue, red and black) rather than to the extremely wide palette of colors available for many architectural paint formulations. However, a number of different ingredients must be combined to form the final road-marking paint. Road-marking paint formulations may also require quick-setting which further complicates their formulation because the manufacturer, seller, or use must balance the advantages of quick-setting with the inherent limited pot-life that such paints exhibit. In addition, road-marking paints may need to be applied, due to road safety requirements, under different conditions than are typically experienced when an architectural paint is applied. For example, road-marking paints may need to be applied over a temperatures range of from just above 0° C. to greater than 40° C. and in different humidities. In addition, road-marking paints are exposed to rigorous conditions immediately after application, such as heavy traffic flow and deteriorating and unexpected weather conditions.

Thus, there is a need for a road-marking paint which can be used at the point of application under the ambient conditions, including temperature, humidity, traffic flow and the like, in addition to the other benefits offered by delayed product differentiation.

SUMMARY OF THE INVENTION

Paint manufacturers and retailers typically offer a range of paints, which includes at least two paint lines. As used herein, "the range including at least two paint lines" is meant that discrete elected levels of an observable property defining a first paint line are combined with discrete elected levels of an observable property defining a second paint line to define the paints in the range of paints. For example, to prepare a range of paints including four paint lines it may be necessary to prepare paints encompassing four sheen levels, four tint bases, two use areas—interior use and exterior use, and three quality levels, and preferably all combinations thereof which means 96 different paint formulations (4×4×2×3) may be needed. Also encompassed, however, is a range of paints in which certain of the defined paints, up to 10–60% of the total number of paints, are selected to be omitted, for example, for commercial reasons. Further contemplated is a range of paints in which the observable properties of the dried paint films substantially, but not exactly, fulfill the definition herein; for example, the sheen of a dried outdoor mid-tone gloss paint in the standard, better, and premium lines may differ by a few points without departing from the meaning of a range of paints of this invention.

A "paint line," as used herein, includes at least two different paints which offer dried film properties which differ materially from each other in at least one observable property such as color and outdoor durability.

As used herein, prepaints are "mutually compatible" if the paints formed by admixing the prepaints do not evidence signs of colloidal instability such as flocculation. Preferably, prepaints, as well as the paints formed from the prepaints, exhibit less than 5 g of residue such as gel and grit per liter of paint when the paint is passed through a 200 mesh screen, more preferably less than 1 g of residue.

The present invention provides a set of different, but mutually compatible, fluid prepaints sufficient to formulate at least one paint line useful for road-marking applications. The prepaints include at least one fluid prepaint including at least one opacifying pigment, at least one fluid prepaint including at least one extender pigment, and at least one fluid prepaint including at least one polymeric binder. Preferably, the number of prepaints is 3–15.

Also provided is a method of forming at least one paint line useful for road-marking applications, which method comprises the steps of:

(a) providing a set of different, but mutually compatible, fluid prepaints sufficient to formulate at least one paint line, which set comprises (i) at least one opacifying prepaint comprising at least one opacifying pigment; (ii) at least one extender prepaint comprising at least one extender pigment, and (iii) at least one binder prepaint comprising at least one polymeric polymer binder; and (b) dispensing a predetermined amount of each of the prepaints into containers or an applicator to form the paint line.

Further provided is a method of forming a range of paints, which range includes at least two paint lines useful for road-marking applications, which method comprises the steps of:

(a) providing a set of different, but mutually compatible, fluid prepaints sufficient to formulate a range of road-making paints, which set comprises (i) at least one opacifying prepaint comprising at least one opacifying pigment; (ii) at least one extender prepaint comprising at least one extender pigment; (iii) at least one binder prepaint comprising at least one polymeric binder; and (iv) at least one additional different prepaint selected from the group consisting of prepaints (i), (ii), and (iii); and (b) dispensing a predetermined amount of each of the prepaints into containers or applicators to form the paints. The total number of prepaints is preferably 4–15.

The above methods may further include the step of mixing the prepaints before, while, or after they are dispensed into the containers or before or while they are dispensed into the applicators.

In another embodiment, the above goal is achieved by employing a set of different, but mutually compatible, fluid prepaints sufficient to formulate at least one paint line useful for road-marking applications. The set comprises (i) at least one opacifying/binder prepaint which comprises at least one opacifying pigment and at least one polymeric binder; and (ii) at least one extender prepaint which comprises at least one extender pigment. The number of prepaints is preferably 2–15, also provided is a method of forming at least one paint line useful for road-marking applications, comprises the steps of:

(a) providing a set of different, but mutually compatible, fluid prepaints sufficient to formulate at least one paint line, which set comprises (i) at least one opacifying binder prepaint comprising at least one opacifying pigment and at least one polymeric binder; and (ii) at least one extender/binder prepaint including at least one extender pigment and at least one polymeric binder; and (b) dispensing a predetermined amount of each of the prepaints into containers or applicator(s) to form the paint line.

A method of forming a range of paints is provided. The range includes at least two paint lines useful for road-marking applications. The method comprises the steps of:

(a) providing a set of different, but mutually compatible, fluid prepaints sufficient to formulate the range of road-marking paints, which set comprises (I) at least one opacifying/binder prepaint comprising at least one opacifying pigment and at least one polymeric binder, (II) at least one extender prepaint comprising at least one extender pigment, and (III) at least one additional different opacifying/binder prepaint or one extender prepaint selected from (I) or (II); and (b) dispensing a predetermined amount of each of the prepaints into containers or applicator(s) to form the range of paints.

The above methods may further comprise the step of mixing the prepaints before, while, or after they are dispensed into the containers or before or while they are dispensed into the applicator(s). The total number of prepaints is preferably 3–15.

The method may further include the step of adjusting the viscosity of the dispensed prepaints before, while, or after they are dispensed into the containers or before or while they are dispensed into the applicator(s) using a thickener, water, or mixtures thereof. The methods may be carried out at a paint manufacturing facility, a point-of-sale or a point-of-use and may be controlled by a computer.

Additives may be used to enhance the application of the road making paints or final performance properties of the road-making paints. In addition, at least one colorant, typically white or yellow, may be added the dispensed prepaints. Alternatively, the opacifying prepaint may further comprise at least one colorant. The colorants are preferably white or yellow.

The prepaints may comprise a polymeric binder that is a latex polymer. They may further comprise at least one quick-setting fluid prepaint. Alternatively, the set of prepaints may contain a polymeric binder that is a quick-setting binder. Alternatively, the quick-setting component may be added as a separate ingredient. Furthermore, a combination of the above may be utilized.

One or more paint lines can be prepared. A paint line includes two or more different paints whose dried films differ materially from each other in at least one observable property.

If only one paint line is desired, i.e., if one key property is to be varied (e.g., sheen level, tint base, use type, or quality type), then the complete paint line can be made from one each of the opacifying prepaint, (i) extender prepaint (ii) and binder prepaint (iii) or one each of opacifying/binder prepaint (I) and prepaint extender (II).

If a range of paints including two paint lines is desired, i.e., if two key properties are varied (e.g., two properties selected from sheen level, tint base, use type, and quality type), this range of paints may be made from: at least one each of the opacifying prepaint, (i) the extender prepaint, (ii) and the binder prepaint (iii) and at least one additional different prepaint selected from the group consisting of opacifying prepaint (i) extender prepaint (ii), and binder prepaint (iii); and opacifying/binder (I), at least one each of prepaint (I), extender prepaint (II) and at least one additional different prepaint selected from the group consisting of the opacifying/binder prepaint I and the extender prepaint II; and depending on which key properties are to be varied. By "additional different prepaints" selected from prepaints (i), (ii), and (iii) or "additional different prepaints" selected from prepaints (I) and (II) is meant a prepaint different from prepaint (i), (ii), and (iii) or (I) and (II), respectively, but otherwise meeting the limitations associated with prepaint (i), (ii), and (iii) or prepaints (I) and (II).

If a range of paints including three paint lines is desired, i.e., if three key properties are varied (for example, three properties selected from sheen level, tint base, use type, and quality type), then the range of paints can be made from at least one each of the opacifying prepaint (i) its extender prepaint (ii) and the binder prepaint (iii) and at least two additional different prepaints selected from the opacifying prepaint (i) the extender prepaint (ii), and the binder prepaint (iii); or at least one each of the opacifying/binder prepaint (I), the extender prepaint (II), and at least two additional prepaints selected from the group consisting of prepaints I and II; depending on which key properties are to be varied.

If a range of paints including four paint lines is desired, i.e., if four key properties are varied (for example, sheen level, tint base, use type, and quality type) then the complete range of paints can be made from at least one each of the opacifying prepaint (i), the extender prepaint (ii), the binder prepaint (iii) and at least three additional different prepaints selected from the group consisting of prepaints (i), (ii), and (iii) or at least one each of opacifying/binder prepaint (I), extender prepaint (II), and at least one additional prepaint selected from the group consisting of prepaints I and II; depending on which key properties are to be varied.

The technique described above may be repeated to vary as many additional key properties as desired.

The pigment volume concentration (hereafter "PVC") is a measure of how "binder-rich" a formulation is. It is calculated using the following formula:

$$PVC(\%) = \frac{\text{volume of pigment(s)} + \text{volume extender(s)}}{\text{volume of pigment(s)} + \text{volume extender(s)} + \text{volume binder(s)}} \times 100$$

The volume solids content (hereafter "VS") is the dry volume of pigment(s) plus dry volume of extender(s) plus dry volume of binder(s). It is calculated using by the following formula:

$$VS(\%) = \frac{\begin{array}{c}\text{dry volume of pigment(s)} + \\ \text{dry volume of extender(s)} + \\ \text{dry volume of binder(s)}\end{array}}{\text{total volume of formulation}} \times 100.$$

If additives are present, their volume is not included in determining the total dry volume.

In each of the above embodiments, the prepaints are selected so they provide a wide formulation space so that the desired final paint properties lie within the blend space defined when the prepaints are at the extremes. In many cases, the prepaints will not by themselves be practical paints; however, by pushing the prepaints to these extremes one can maximize the blend space available for the paint line. When the prepaints, additives, and colorants are all fully compatible, they can be blended at the desired ratios to achieve the desired paint line(s) and range of paints without inducing colloidal instability.

This technique is similar to the design principles used in statistical experimental design and analysis of mixture component designs; however, instead of designing a mixture space to explore the response surface within it, one is designing the boundaries of the mixture space to maximize the flexibility of the paint system. The key to success is to have mutual compatibility of the individual ingredients in each prepaint and of the prepaints across the mixture space.

Paint properties can be predicted in a number of ways. One approach is to develop response surface models of the blend space using standard mixture component experimental design statistical tools. These simple statistical models can then be used by a linear optimization program, by a massive grid search, or by a graphical analysis tool. Another approach is to simply use empirical methods to determine which blends are needed for specific paint lines, then incorporate those simple empirical recipes in the paint making machine software.

An extension of these techniques is to have the paint machine automatically pretest certain key properties (e.g., viscosity, drying speed, opacity or color) and make minor adjustments during the formulating of the paint from the prepaints. Having feedback loops in the paint machine can provide more precise matching of viscosity, drying speed, opacity, and color targets.

If colorants and optional additives are included in the prepaints to enhance specific paint properties and the additives and/or colorants are fully compatible, i.e., they can be blended at any ratio without inducing colloidal instability, then they can be blended in any combination falling within the formulation space needed to achieve the desired profile in the final paint. It is sufficient, however, for the colorants and optional additives to be compatible, i.e., they can be blended at desired ratios to achieve the desired property profile in the range of paints without inducing colloidal instability.

As used herein, "compatible paint ingredients" may be combined in the various prepaints and the paints formed from the prepaints provide the properties characteristic of the amount of ingredient used.

Preferably, all the fluid prepaints used in the methods of the present invention have the same or similar viscosities. This aids in mixing. Viscosity fluctuations in the final paints is expected to be reduced because of the prior equilibration of ingredients in the prepaints.

The prepaints are formulated to maximize the flexibility of paint manufacturing. Rather than purchasing individual paint ingredients, paint manufacturers, and even buyers at point-of-sale and point-of-use (paint stores, paint departments, and contractors) can purchase the set of prepaints required to prepare a desired range of paints. These prepaint sets will contain at least one each of the opacifying prepaint, the extender prepaint, and the binder prepaint and possibly additional prepaints depending upon the formulating flexibility desired. Optionally, the above prepaints are mixed with an additional prepaint which includes at least one colorant such as a colored pigment or dye.

The method of the present invention is not limited to preparing only latex paints per se but may also be extended to preparing any water-borne or solvent-borne coating, or related building product requiring mixing of ingredients, including, sealants, caulks, mastics, adhesives and other building-related products.

DETAILED DESCRIPTION OF THE INVENTION

In one embodiment, the prepaint is a fluid titanium dioxide prepaint which comprises at least one titanium dioxide opacifying pigment, at least one dispersant, at least one thickener, and water. The prepaint ingredients and other optional paint ingredients are mutually compatible with each other and in the final paint. The prepaint has a volume solids content of about 30% to about 80%, preferably about 40% to about 65%, and a Stormer viscosity of about 50 to about 250 KU, preferably about 60 to about 150 KU. Preferably, the prepaint is stable to sedimentation, i.e., the pigment does not settle out after 10 days at 25° C.

In another embodiment, the prepaint is a fluid titanium dioxide prepaint useful for formulating a one pack, pigmented latex paint containing other paint ingredients. The prepaint includes at least one opacifying pigment, at least one dispersant, at least one thickener, at least one film-forming or nonfilm-forming polymeric binder, and water. The prepaint ingredients are mutually compatible with each other and with other optional paint ingredients. The prepaint has a volume solids content of about 30% to about 80%, preferably about 40% to about 65%, a PVC of about 35% to 100%, preferably about 45% to 100%, and a Stormer viscosity of about 50 to about 250 KU, preferably about 60 to about 150 KU. Preferably, the prepaint is stable to sedimentation, i.e., it does not settle out after 10 days at 25° C. Optionally, the polymeric binder is adsorbed onto the titanium dioxide opacifying pigment or other opacifier of present.

In one embodiment of the pigment extender prepaint, the prepaint includes at least one mineral extender, at least one thickener, an optional polymeric binder and water. The prepaint has a volume solids content of about 30% to about 80%, preferably about 40% to about 70%, a PVC of about 35% to 100%, preferably about 40% to 100%, and a Stormer viscosity of about 50 to about 250 KU, preferably about 60 to about 150 KU. The prepaint ingredients are compatible with each other and with the ingredients of the other prepaints and should be compatible with ingredients of the other prepaints with which it will be used.

In one embodiment of extender prepaint (II), the fluid pigment extender prepaint includes at least one mineral extender, at least one thickener, a polymeric binder and water. The prepaint has a volume solids content of about 30% to about 80%, preferably about 40% to about 70%, a PVC of about 35% to 100%, preferably about 40% to 100%, and a Stormer viscosity of about 50 to about 250 KU, preferably about 60 to about 150 KU. The prepaint ingredients are compatible with each other and with the ingredients of the other prepaints and should be compatible with the ingredients of the other prepaints with which it will be used.

In one embodiment, fluid latex polymer binder prepaint includes a water-borne latex polymer binder having a Tg of about −30° C. to about 70° C., preferably about −10° C. to about 60° C., and water. The binder prepaint has a volume solids content of about 25% to about 70%, preferably about 30% to about 65%, and a Brookfield viscosity of less than about 100,000 centipoise, preferably about 100 to about 50,000 centipoise, at a shear rate of 1.25 reciprocal seconds. The prepaint ingredients are compatible with each other and with the ingredients of the other prepaints that they will be used with.

In the embodiments where prepaints I, II, i, ii, and iii are used, minor amounts, i.e., less than about 20% by weight, based on the total weight of the prepaint, of conventional paint additives an acid, a base, a defoamer, a coalescent, a cosolvent, a dispersing resins, a mildewcide, a biocide, an antifreeze agent, a durability enhancer (including water-miscible or emulsified epoxies, waterborne isocyanates and silanes), and the like may be included. These additives must be compatible with the other paint ingredients in the prepaints and the other prepaints used in the methods of this invention. Furthermore, if durability enhancers are employed, the road-marking paint may have a pot-life of less than about 8 hours and thus would need to be applied in this time frame.

Opacifying pigments useful herein include white pigments which impart white scattering power to the paint across all visible wavelengths without a high degree of absorption. Pigment extenders are inorganic solids or opaque polymers which do not impart the primary color or hiding power to the paint although they may have secondary influences on those properties. The tint bases used for deep tone paints typically contain no or only very low levels of opacifying pigments.

Suitable opacifying pigments include titanium dioxide ($TiO_2$) or a combination of titanium dioxide and auxiliary hiding pigments such as voided latex polymer particles, zinc oxide, lead oxide, a synthetic polymer pigment, and mixtures thereof. Rutile and anatase grades of titanium dioxide are suitable for use herein. Rutile titanium dioxide is preferred. The surface of the titanium dioxide may be treated with various organic and/or inorganic surface treatments, e.g., as the oxides of silica, alumina, and zirconia. Fumed titanium dioxide is also useful herein.

The voided latex particles useful herein have a particle size diameter of about 100 nm to about 2,500 nm, preferably about 500 nm to 1,100 nm and a void fraction of about 10% to about 75%. The voided latex particles have at least one void but may have multiple voids, non-spherical voids, interconnected voids, voids having channels connected to the outside of the particles, and void structures described as vesiculated and sponge-like. Preferably, the voided latex particles have a single void. The voided latex particles have a glass transition temperature (Tg), as measured by differential scanning calorimetry at a rate of 20° C./min, of at least about 20° C., preferably at least about 50° C. The higher the glass transition temperature, the harder the particle is and the less likely it is to collapse. If the voided latex particles collapse, they are unable to contribute to hiding. The voided latex particles may be prepared by conventional polymerization processes known in the art, such as those disclosed in U.S. Pat. No. 3,784,391, U.S. Pat. No. 4,798,691, U.S. Pat. No. 4,908,271, U.S. Pat. No. 4,972,000, U.S. Pat. No. 5,041,464, U.S. Pat. No. 5,157,084, U.S. Pat. No. 5,216,044 and U.S. Pat. No. 6,020,435, as well as Japanese Patent Applications 60/223,873, 61/62510, 61/66710, 61/86941, 62/127336, 62/156387, 01/185311, and 02/140272. Preferably, the voided latex particles are prepared according to U.S. Pat. No. 4,427,836, U.S. Pat. No. 4,469,825, U.S. Pat. No. 4,594,363, U.S. Pat. No. 4,880,842, U.S. Pat. No. 5,494,971 and U.S. Pat. No. 6,020,435.

Extender pigments provide low cost volume, are not soluble in water, and have a low absorption number. Extender pigments used in road-marking paints are optimized for dispersion viscosities, brightness, and low cost. Suitable extender pigments include barium sulfate (about 1 to about 15 microns), Blanc Fixe (about 0.5 to about 5 microns), calcium carbonate (about 0.05 to about 35 microns), silica (about 0.001 to about 14 microns), magnesium silicate (about 0.5 to about 15 microns), aluminum silicate (about 0.2 to about 5 microns), mica, bentonite, magnesium alumino-silicate, fumed allumina, colloidal attapulgite, synthetic amorphous sodium alumino-silicate, sodium potassium alumino-silicate, and the like including combinations thereof. Glass, ceramic, polymeric beads or microspheres and combinations thereof may also be used.

Latex polymeric binders are polymers or prepolymers which form the primary film of the paint. Binders bind the pigment(s) and/or extender(s), provide the required paint flow, and determine the durability and drying properties of the final paint film. The binders selected for the prepaints will depend upon the final use of the formulated paints. It may be necessary and desirable to use binders which may be either quick-setting or non-quick-setting and which have the ability to achieve quick-setting times between the slowest and fastest setting times. For example, it may be desirable to include binders which are quicker setting when the paints are applied on a humid or rainy day, but not desirable from a cost perspective when the paints are applied on a dry day. It is within the scope of the present invention to utilize both types of binders in the system by:

(1) separating the component(s)/ingredient(s) that cause the quick-setting ("quick-setting component") from the component(s)/ingredient(s) that form the binder as a separate prepaint;

(2) employing a quick-setting binder in the binder prepaints (when a quick-setting binder is not required as a separate quick-setting component);

(3) adding the quick-setting component separately from any of the prepaints; and (4) combinations thereof.

In the method of the invention, the quick-setting component is added as a separate component or prepaint, as described in Example 4 below. By controlling the presence and level of either the quick-setting component or the quick-setting binder, one can "dial-in" exactly the formulation that one wants depending upon cost structure and environmental conditions.

As used herein, the term "quick-setting," means a coating that has a drying time of no greater than about 10 minutes as measured by a modified ASTM D1640 dry time test. The test used is similar to ASTM D1640 which is a standard test for drying of organic coatings at room temperature in which the test films are applied on a non-porous substrate (e.g., a glass plate or metal panel) by a suitable means to give a wet film thickness of 0.012+/−0.001 inches. The ASTM test method is modified in that only minimal thumb pressure is applied. The thumb is turned through an angle of 90° while in contact with the test film. The drying time at which this rotation does not break the film is recorded.

A number of these quick-setting binder systems are known in the art. Suitable quick-setting systems (with either quick-setting binders or components) include, but are not limited to:

(a) an aqueous dispersion including an anionically-stabilized polymer having a Tg of at least about −10° C., a non-protonated or partially protonated polyamine functional polymer formed from either an amine or an imine monomer (quick-setting component), and a volatile base in an amount sufficient to deprotonate the conjugate acid of the polyamine functional polymer;

(b) an aqueous dispersion including a polyamine functional polymer that is a latex polymer having pendant amine-functional groups and a Tg of at least about −10° C. (i.e., quick-setting binder or component) and a volatile base in an amount sufficient to deprotonate the conjugate acid of the polyamine functional polymer;

(c) an aqueous dispersion including a polyamine functional polymer that is a latex polymer having pendant amine-functional groups and pendant acid-functional groups where the ratio of amine-functional groups to acid-functional groups is greater than about 3 to 1 and where the polymer has a Tg of at least about −10° C. and pendant acid-functional groups (i.e., quick-setting binder or component); and a volatile base in an amount sufficient to deprotonate the conjugate acid of the polyamine functional polymer;

(d) an aqueous dispersion including a polyamine functional polymer having a Tg of at least about −10° C. and that is a latex polymer having pendant amine-functional groups (i.e., quick-setting component), and a latex polymer that has a Tg of at least about −10° C. pendant acid-functional groups (i.e., quick-setting component), and a volatile base in an amount sufficient to deprotonate the conjugate acid of the polyamine functional polymer;

(e) an aqueous dispersion including an aqueous emulsion containing a polyamine functional polymer (i.e., quick-setting binder or component) having a Tg of at least about −10° C., formed from polymerizable monomers including (a) alkyl esters of acrylic or methacrylic acid where the alkyl ester is a $C_1$–$C_{18}$ alkyl ester; (b) from about 0.1 to about 5% by weight, based on the acrylic or methacrylic film forming polymer of at least one secondary or tertiary aminoacrylate monomer, or secondary or tertiary aminomethacrylate monomer, and (c) from about 0.1 to about 5% by weight, based on the acrylic or methacrylic film forming polymer of a crosslinkable monomer selected from the group consisting of acrylamide, methacrylamide, and N-alkylol acrylamide; and said polyamine functional polymer having less than 3 percent by weight, based on said film forming polymer of hydrophilic monomer incorporated therein, and a volatile base in an amount sufficient to deprotonate the conjugate acid of said polyamine functional polymer;

(f) a composition including an aqueous dispersion including a polymer having a Tg of at least about −10° C. pendant strong cationic groups (i.e., quick-setting component); an aqueous dispersion including a polymer having a Tg equal to or greater than about −10° C. pendant weak acid groups;

(g) an aqueous dispersion including a polymer having a Tg of at least about −10° C. and both pendant strong cationic groups and pendant weak acid groups (quick-setting binder), wherein the polymer has.

Suitable polymeric binders include, but are not limited to, latex polymers such as homopolymers, copolymers, or terpolymers such as acrylic and/or methacrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic, and urethane polymers, optionally containing up to 10% by weight of functional monomers such as carboxylic acid, phosphate, sulfate, sulfonate, amide and like functional monomers and combinations thereof. Polymeric binders optionally incorporated in opacifying prepaint and extender prepaint and the different prepaints selected from prepaints, or other prepaints, may be the same as or different from the polymeric binder incorporated in binder prepaint. Likewise, polymeric binders incorporated in opacifying/binder prepaint and extender prepaint and the different prepaints selected from other prepaints, may be the same as or different from each other. Other binders such as alkyds and their blends with chlorinated rubber, solvent-borne thermoplastic acrylics, unsaturated polyesters, two-part epoxies and the like may be included in the prepaints.

Thickener is a general term which includes any material added to a paint to modify its Theological profile. Preferred thickeners for use herein are associative thickeners. Suitable thickeners for use herein include polyvinyl alcohol (PVA), hydrophobically-modified, alkali soluble emulsions known in the art as HASE emulsions, alkali-soluble or alkali-swellable emulsions known in the art as ASE emulsions, hydrophobically-modified ethylene oxide-urethane polymers known in the art as HEUR thickeners, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite clay and other types of clay, titanate chelating agents, and the like.

Suitable dispersants for use herein include non-ionic, anionic, and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Anionic polymers such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers. Also, included are salts of the aforementioned polymers, as well as mixtures of these dispersants.

Suitable defoamers include silicone-based and mineral oil-based defoamers, and the like.

Coalescents are not necessary if solvent-free latex polymeric binders are used in the binder prepaints. Solvent-free binders typically have a low Tg and low minimum film-forming temperature so that they are film-forming at ambient temperatures, such as about 20° C. If a coalescent is required, preferably it is incorporated in each of binder prepaint (iii) and any other prepaints containing latex polymeric binders. Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable surfactants include cationic, anionic, and non-ionic surfactants.

As used herein, the term "road" is used as a generic term and includes any indoor or outdoor solid surface which is or may be exposed to pedestrians, moving vehicles, tractors, or aircrafts constantly or intermittently. Some non-limiting examples of a "road" include highways, streets, driveways, sidewalks, runways, taxiing areas, tarmac areas, parking lots, rooftops, indoor floors (such as in factories or shopping malls), and like surfaces. The surface material may be masonry, tar, asphalt, resins, concrete, cement, plaster, stone, stucco, tiles, wood, polymeric materials, metals such as aluminum, stainless steel, or carbon steel), and combinations thereof. All of the substrates may already have one or more layers of existing coating or paint which may be fresh or aged.

The road-marking paint may be applied to the surface by a number of ways known to those having ordinary skill in the art, including, but not limited to, spraying, rolling, brushing, extrusion, and combinations thereof.

Any of the prepaints may optionally contain absorbers that accelerate the drying of the road-marking paint, provided that the absorbers are added to the prepaint in a time frame that will permit the application of the paint. The addition of an absorber to a prepaint will cause a rapid increase in viscosity that may make it difficult or impossible to apply. Thus, the absorber may need to be added immediately prior to application to the road surface. In addition, the absorbers may be added separately. Suitable absorbers include organic superabsorbent polymers, ion-exchange resins, hollow sphere polymers, molecular sieves, tales, inorganic absorbers such as inorganic superabsorbent gels and Sumica gel, porous and non-porous carbonaceous materials, encapsulated, alkali-swellable polymers, and mixtures thereof. The level of absorber used is in the range of from about 0.01% by weight to about 90% by weight, preferably from about 0.1% by weight to about 70% by weight, more preferably from about 1% by weight to about 30% by weight, based on the total weight of the latex polymer in the final paint.

Postponement of road-marking paint production can be particularly advantageous when techniques are used to accelerate the drying of the paint. Such techniques include the addition of optional additives, such as absorbers that accelerate the drying of the road-marking paint, or the use of reactive ingredients that crosslink/cure or "quick-set," as defined herein. Because such systems have a limited pot-life and must be utilized soon after preparation, formulating the road-marking paint at the point-of-use provides an improved manufacturing technique. It becomes much more practical to utilize such techniques because the paint is used shortly after it is formulated. Such techniques are further enhanced by producing the road-marking paint in the applicator(s) itself, shortly before or while the road-marking paint is applied. Production in the applicator(s), such as one mounted on the back of a vehicle used for road striping, avoids the problems normally associated with the use of quick-setting paints systems, i.e., the instability or rapid absorption of water that provides the quick-setting character but requires application of the paint sometimes within a very short time (e.g., from a few minutes to a few hours) after activation of the quick-setting character (i.e., by mixing or addition).

Such quick-drying systems have very short dry times on the road and/or produce highly durable markings. To achieve formulation of the paint in the applicator(s), the prepaints, pumps and applicator(s) are advantageously mounted on vehicles that then applies the markings.

Crosslinking of water-borne road-marking paint may be achieved by adding water-miscible or emulsified epoxies, water-borne isocyanates, silanes and the like. Quick-setting binder systems, as described herein, also represent a type of crosslinking or curing (i.e., ionic) and their use also benefits from postponement of the paint manufacture to the paint-of-use. This allows the use of quick-setting components that would have very limited pot life in the road-making paint.

For example, a polyamine with a pKa that results in a protonated amine with very little loss of the volatile base which will deprotonate it, will have poor stability, but dry very rapidly on the road. Such quick-setting and crosslinking systems benefit from postponing preparation of the paint up to and including preparation of the paint in the applicator(s) because of their short pot life.

The prepaints herein permit the production of the final road-marking paint at many locations beyond the conventional paint manufacturing facility and may include production at the point-of-use, such as in an on-line painting vehicle or on the job site, at a distributor, at a government transportation facility, and at point-of-sale (for example, manufacturer's retail store or large retail building-products facility).

In order to minimize the number of paint ingredients needed to prepare a range of road-marking paints one needs to consider the extremes of key properties required for the range of paints and then formulate prepaints which are capable of being blended in various combinations and amounts to provide the key properties required at their extreme values as well as at intermediate points. Specific properties may also be improved by adding paint additives which enhance the desired property.

All ranges disclosed herein are inclusive and the minimums and maximums of the nested ranges are combinable.

EXAMPLES

Example 1

The following ingredients are mixed to form a white opacifying prepaint which should have PVC of 50.8%, a VS of 57.43%, and a weight solids of 79.0%:

| Ingredients | Amount (lbs/100 gallons) |
| --- | --- |
| Opacifying pigment - TiO$_2$ (TiPure R-900, E.I. DuPont and Company, Wilmington, DE) | 1000.0 |
| Dispersant - Tamol 901 30% (Rohm and Haas Company, Philadelphia, PA) | 28.0 |
| Wetting Aid - Surfynol CT 136 (Air Products, Inc., Allentown, PA) | 12.0 |
| Defoamer - Drew L-493 (Drew Chemical Company, Kearny, NJ) | 10.0 |
| Acrylic Emulsion Polymer Binder 50% solids (Rhoplex AC-630, (Rohm and Haas Company, Philadelphia, PA) | 532.7 |
| Coalescent - Texanol (Eastman Chemical, Kings Port, TN) | 20.0 |
| Water | 14.2 |
| Ammonium hydroxide (28% NH$_3$) | 6.0 |
| HEUR Thickener - Acrysol SCT-275 (Rohm and Haas Company, Philadelphia, PA) | 1.5 |

The prepaint is prepared using a laboratory mixer having a 45° pitch stirring blade. The binder, water, dispersant, wetting aid, and defoamer are combined and mixed. The titanium dioxide is slowly added and the mixture is stirred for 15–20 minutes. The coalescent, thickener, ammonium hydroxide, and additional water, if necessary, are then added.

Example 2

The following ingredients are mixed to form a yellow opacifying pigment prepaint which should have a PVC of 51.7%, a VS of 57.7%, and a weight solids of 67.5%:

| Ingredients | Amount (lbs/100 gallons) |
|---|---|
| Opacifying pigment - TiO$_2$ (TiPure R-900, E.I. DuPont and Company, Wilmington, DE) | 181.8 |
| Yellow Pigment - Hansa Yellow (Engelhard Corp., New Jersey) | 291.0 |
| Wetting Aid - Surfynol CT136 (Air Products Inc., Allentown, PA) | 10.9 |
| Dispersant - Tamol 901 30% (Rohm and Haas Company, Philadelphia, PA) | 26.0 |
| Defoamer - Drew L-493 (Drew Chemical Company, Kearny, NJ) | 9.1 |
| Acrylic Emulsion Binder 50% solids (Rhoplex AC-630) (Rohm and Haas Company, Philadelphia, PA) | 525.4 |
| Coalescent - Texanol (Eastman Chemical, Kings Port, TN) | 20.9 |
| Water | 18.8 |
| Ammonium Hydroxide (28% NH$_3$) | 5.4 |
| HEUR Thickener Acrysol SCT-275 (Rohm and Haas Company, Philadelphia, PA) | 1.4 |

The prepaint is prepared using a laboratory mixer having a 45° pitch stirring blade. The binder, water, dispersant, wetting aid and defoamer, are combined and mixed. The titanium dioxide and yellow pigment are slowly added and the mixture is stirred for 15–20 minutes. The coalescent, thickener, ammonium hydroxide, and additional water, if necessary, are then added.

Example 3

The following ingredients are mixed to form an extender pigment prepaint which should have a PVC of 61.0%, a VS of 61.4%, and a weight solids of 77.4%:

| Ingredients | Amount (lbs/100 gallons) |
|---|---|
| Calcium Carbonate Extender - Omyacarb 5 (Omya, Proctor, VT) | 845.1 |
| Dispersant - Tamol 901 30% (Rohm and Haas Company, Philadelphia, PA) | 4.9 |
| Wetting Agent- Surfynol CT-136 (Air Products Inc., Allentown, PA) | 1.8 |
| Defoamer - Drew L-493 (Drew Chem. Corp., Kearny, NJ) | 5.0 |
| Acrylic Binder - (Rhoplex AC-630, 50% solids (Rohm and Haas Company, Philadelphia, PA) | 452.0 |
| Methanol | 33.3 |
| Coalescent - Texanol (Eastman Chemical, Kings Port, TN) | 23.3 |
| Water | 14.0 |
| Ammonium Hydroxide (28% NH$_3$) | 3.7 |
| HEUR Thickener - Acrysol SCT-275 (Rohm and Haas Company, Philadelphia, PA) | 0.2 |

The prepaint is prepared using a laboratory mixer having a 45° pitch stirring blade. The binder, water, dispersant, wetting aid and defoamer are combined and mixed. The extender pigment is slowly added and the mixture is stirred for 15–20 minutes. The methanol, coalescent, thickener, ammonium hydroxide, and additional water, if necessary, are then added.

Example 4

The following ingredients are mixed to form polyamine prepaint which should be quick-setting. It should have a PVC of 0%, a VS of 27.4%, and a weight solids of 28.8%:

| Ingredients | Amount (lbs/100 gallons) |
|---|---|
| Polyamine (29.8%)* | 837.54 |
| Water | 12.5 |
| Methanol | 20.0 |

*As described in US 6,013,721, example 3.

Example 5

White road-marking paints are formed by combining the prepaints described above in the following manner:

| Paint No. | Prepaints (lbs.) | | | |
|---|---|---|---|---|
| | White (Ex. 1) | Extender (Ex. 3) | Polyamine (Ex. 4) | Water |
| 5-1 | 160.44 | 1244.88 | — | 15.4 |
| 5-2 | 112.31 | 1286.38 | — | 15.4 |
| 5-3 | 160.44 | 1244.88 | 8.0 | 7.7 |
| 5-4 | 112.31 | 1286.38 | 8.0 | 7.7 |
| 5-5 | 160.44 | 1244.88 | 16.0 | — |
| 5-6 | 112.31 | 1286.38 | 16.0 | — |

The resulting paints should have the following properties:

| Paint No. | Paint Properties | | |
|---|---|---|---|
| | PVC (%) | VS (%) | WS (%) |
| 5-1 | 60.0 | 60.0 | 76.7 |
| 5-2 | 60.3 | 60.0 | 76.7 |
| 5-3 | 60.0 | 60.1 | 76.9 |
| 5-4 | 60.3 | 60.1 | 76.9 |
| 5-5 | 60.0 | 60.2 | 77.1 |
| 5-5 | 60.3 | 60.2 | 77.1 |

Paint No. 5-1 is a slower dry white traffic paint.
Paint No. 5-2 is a lower cost, slower dry white traffic paint.
Paint No. 5-3 is a fast dry white traffic paint.
Paint No. 5-4 is a lower cost, fast dry white traffic paint.
Paint No. 5-5 is a faster dry, white traffic paint.
Paint No. 5-6 is a lower cost, faster dry white traffic paint.

Example 6

Yellow road-marking paints may be formed by combining the prepaints described above in the following manner:

| Paint No. | Prepaints (lbs.) | | | |
|---|---|---|---|---|
| | Yellow (Ex. 2) | Extender (Ex. 3) | Polyamine (Ex. 4) | Water |
| 6-1 | 119.98 | 1231.05 | — | 15.4 |
| 6-2 | 76.35 | 1286.38 | — | 15.4 |
| 6-3 | 119.98 | 1231.05 | 8.0 | 7.7 |
| 6-4 | 76.35 | 1286.38 | 8.0 | 7.7 |
| 6-5 | 119.98 | 1231.05 | 16.0 | — |
| | 76.35 | 1286.38 | 16.0 | — |

The resulting paints should have the following properties:

| Paint | Paint Properties | | |
|---|---|---|---|
| No. | PVC (%) | VS (%) | WS (%) |
| 6-1 | 60.0 | 60.0 | 75.7 |
| 6-2 | 60.3 | 60.0 | 76.0 |
| 6-3 | 60.0 | 60.1 | 75.9 |
| 6-4 | 60.3 | 60.1 | 76.2 |
| 6-5 | 60.0 | 60.2 | 76.1 |
| 6-6 | 60.3 | 60.2 | 76.4 |

Paint No. 6-1 is a slower dry yellow traffic paint.
Paint No. 6-2 is a lower cost, slower dry yellow traffic paint.
Paint No. 6-3 is a fast dry yellow traffic paint.
Paint No. 6-4 is a lower cost, fast dry yellow traffic paint.
Paint No. 6-5 is a faster dry, yellow traffic paint; and
Paint No. 6-6 is a lower cost, faster dry yellow traffic paint.

What is claimed is:

1. A set of mutually compatible, fluid aqueous prepaints, sufficient to formulate at least one aqueous road-marking paint, comprises:
   (a) an opacifying prepaint which consists essentially of a titanium dioxide opacifying pigment, a dispersant, a thickener; and water;
   (b) a pigment extender prepaint which consists essentially of a mineral extender, a thickener, and water;
   (c) a binder prepaint which consists essentially of a latex polymeric binder which is a non-quick-setting polymer which has a glass transition temperature of at least about −10° C. and water;
   (d) a quick-setting polymer dissolved or dispersed in water; and
   (e) optionally water.

2. A set of mutually compatible, fluid aqueous prepaints sufficient to formulate at least one aqueous road-marking paint, comprises:
   (a) an opacifying prepaint which consists essentially of a titanium dioxide opacifying pigment, a dispersant, a thickener, and water;
   (b) a pigment extender prepaint which consists essentially of a mineral extender, a thickener, and water;
   (c) a quick-setting latex polymeric binder prepaint which consists essentially of a polymer having a Tg of at least about −10° C. containing pendant amine groups, or containing pendant strong cationic groups, or containing pendant strong cationic groups and weak acid groups, and water, wherein a volatile base is present when the polymer contains pendant amine groups; and
   (d) optionally water.

3. The set of claim 1, wherein the quick-setting polymer is a non-protonated or a partially protonated polyamine; a polyamine having pendant amine groups and pendant acid groups; or a polymer which contains strong cationic groups; wherein a volatile base is present when the polymer is a polyamine.

4. The set of claim 3, wherein the non-protonated or the partially protonated polyamine is formed from either an amine monomer or an imine monomer.

5. The set of claim 1 or 2, wherein the titanium dioxide is selected from the group consisting of rutile grade titanium dioxide, anatase grade titanium dioxide, and fumed titanium dioxide.

6. The set of claim 1 or 2, wherein the opacifying prepaint further consists essentially of a yellow pigment.

7. The set of claim 1 or 2, wherein the opacifying prepaint further consists essentially of an auxiliary hiding pigment.

8. The set of claim 7, wherein the auxiliary hiding pigment is selected from the group consisting of zinc oxide, lead oxide, a synthetic polymer, and mixtures thereof.

9. The set of claim 8, wherein the synthetic polymer is a voided latex polymer particle.

10. The set of claim 1 or 2, wherein the opacifying prepaint and/or the pigment extender prepaint further consist essentially of a polymeric binder.

11. The set of claim 1 or 2, wherein the binder prepaint further consists essentially of a defoamer, a coalescent, a mildewcide, and/or a surfactant.

12. A method of forming at least one road-marking paint line comprises the steps of:
   (1) providing the prepaint set of claim 1;
   (2) dispensing a predetermined amount of the prepaints (a), (b), and (c) and the quick-setting polymer (d) into container(s) or applicator(s) to form the road-marking paint line.

13. A method of forming at least one road-marking paint line comprises the steps of:
   (1) providing the set of claim 2,
   (2) dispensing a predetermined amount of the prepaints (a), (b), and (c) into container(s) or applicator(s) to form the road-marking paint line.

14. A method of forming a range of road-marking paint lines, which range comprises at least two road-marking paint lines, which method comprises the steps of:
   (a) providing a set of prepaints sufficient to formulate at least two road-marking paint lines, which set comprises (i) the prepaint set of claim 1 and (ii) at least one additional prepaint selected from the group consisting a different opacifying prepaint, a different pigment extender prepaint, a different binder prepaint, or a different quick-setting polymer; and
   (b) dispensing a predetermined amount of each of the prepaints and at least one additional but different prepaint or polymer into container(s) or applicator(s) to form the road-marking paint lines.

15. A method of forming a range of road-marking paint lines, which range comprises at least two road-marking paint lines, which method comprises the steps of:
   (a) providing a set of prepaints sufficient to formulate at least two road-marking paint lines, which set comprises (i) the prepaint set of claim 2 and (ii) at least one additional prepaint selected from the group consisting a different opacifying prepaint, a different pigment extender prepaint, a different quick-setting binder prepaint; and
   (b) dispensing a predetermined amount of each of the prepaints and at least one additional but different prepaint or polymer into container(s) or applicator(s) to form the road-marking paint lines.

16. A method of claims 12, 13, 14 or 15, further comprising the step of mixing the dispensed prepaints.

17. The method of claim 16, further comprising the step of adding an absorbent during the mixing step.

18. The method of claim 17, wherein the absorbent is a super-absorbant polymer or gel, an ion exchange resin, a molecular sieve, a talc, a carbonaceous material, and/or an encapsulated, alkali swellable polymer.

* * * * *